United States Patent
Kim et al.

(10) Patent No.: US 12,399,694 B2
(45) Date of Patent: Aug. 26, 2025

(54) EDGE CLOUD BUILDING SYSTEM AND METHOD FOR HIGH-SPEED INSTALLATION OF COMPONENTS OF EDGE CLOUD

(71) Applicants: ACORNSOFT CO., LTD., Seoul (KR); Jin Bum Kim, Seoul (KR)

(72) Inventors: Jin Bum Kim, Seoul (KR); Dong Muk Lee, Incheon (KR)

(73) Assignees: Jin Bum Kim, Seoul (KR); ACORNSOFT CO., LTD., Seoul (KR)

( * ) Notice: Subject to any disclaimer, the term of this patent is extended or adjusted under 35 U.S.C. 154(b) by 410 days.

(21) Appl. No.: 18/148,097

(22) Filed: Dec. 29, 2022

(65) Prior Publication Data
US 2023/0214202 A1    Jul. 6, 2023

(30) Foreign Application Priority Data
Dec. 30, 2021    (KR) .......................... 10-2021-0192216

(51) Int. Cl.
*G06F 9/44*    (2018.01)
*G06F 8/61*    (2018.01)
*G06F 9/48*    (2006.01)

(52) U.S. Cl.
CPC .............. *G06F 8/63* (2013.01); *G06F 9/4806* (2013.01)

(58) Field of Classification Search
CPC ................................ G06F 8/63; G06F 9/4806
See application file for complete search history.

(56) References Cited

U.S. PATENT DOCUMENTS

| | | | |
|---|---|---|---|
| 11,010,191 B1* | 5/2021 | Hornbeck | G06F 8/63 |
| 2011/0277027 A1* | 11/2011 | Hayton | G06F 21/554 726/8 |
| 2019/0342160 A1* | 11/2019 | Baddepudi | G06F 9/5077 |
| 2021/0377336 A1* | 12/2021 | Lincourt | H04L 47/822 |
| 2023/0179628 A1* | 6/2023 | Porras | G06F 40/30 726/22 |

* cited by examiner

*Primary Examiner* — Qamrun Nahar
(74) *Attorney, Agent, or Firm* — NKL Law; Jae Youn Kim

(57) ABSTRACT

The present invention relates to an installation technology of components of an edge cloud, and particularly, to a system and a method of edge cloud building for high-speed installation of components of an edge cloud, which can reduce generation and setting operation hours of individual components by automating installation of individual components of the edge cloud.

To this end, in the edge cloud building system according to the present invention as a edge cloud building system for high-speed installation of components of an edge cloud, hierarchical components (IaaS, KaaS, PaaS) of an edge cloud are installed by using a server node image and a PaaS component image, and then detailed setting of the hierarchical components is performed by using a declarative script.

2 Claims, 3 Drawing Sheets

EDGE CLOUD BUILDING SYSTEM AND METHOD FOR HIGH-SPEED INSTALLATION OF COMPONENTS OF EDGE CLOUD

CROSS-REFERENCE TO RELATED APPLICATIONS

This application claims the priority of Korean Patent Application No. 10-2021-0192216 filed on Dec. 30, 2021, in the Korean Intellectual Property Office, the disclosure of which is incorporated herein by reference.

BACKGROUND OF THE INVENTION

Field of the Invention

The present invention relates to an installation technology of components of an edge cloud, and particularly, to a system and a method of edge cloud building for high-speed installation of components of an edge cloud, which can reduce generation and setting operation hours of individual components by automating installation of individual components of the edge cloud.

Description of the Related Art

The use of a cloud infrastructure is convenient, but building the cloud infrastructure is not easy. The well-equipped cloud infrastructure as an on-demand service which is a complicated process which provides users with convenience of resource use, but in order to build the cloud infrastructure itself, a lot of time is made to prepare for commercial use from design to installation and testing, and takes and involves repetition of trial and error. The cloud infrastructure should be built by an engineer which is highly trained due to the complexity of components and the difficulty of installation and setting.

As the innovation of a computing infrastructure is spreading to edge computing through cloud computing, the intelligence of a terminal such as a robot, a drone, an autonomous vehicle, etc., progresses rapidly, so a high-level real-time response processing ability and large data collection and learning ability from the terminal are required, which cannot be compared with the conventional art by being equipped with an AI service.

Since the abilities are required, cloud computing that processes all data at the center is built, but there is a limit by the cloud computing, so an edge cloud appears in order to overcome this limit.

The demand of the edge cloud gradually increases, and the building of the edge cloud becomes a more difficult task than building the previous cloud infrastructure building.

The demand for the edge cloud significantly increases, focusing on a technology that leads the 4$^{th}$ industrial revolution such as 5G, IoT, AI/ML, AR/VR, a robot, etc., and a difficulty in building the cloud infrastructure exponentially increases in an edge computing environment in which numerous small-unit data centers should be densely distributed throughout a broad region. In terms of Korean standards, there are more than 40000 base station-unit edge cloud infrastructures required for the 5G service.

As a result, there is a situation in which automation of building of the cloud infrastructure is required so as to meet the demand for the edge cloud. In particular, a new installation method is required, which can rapidly build the edge cloud by shortening hours required for installing respective components (IaaS, KaaS, and PaaS) of the edge cloud.

SUMMARY OF THE INVENTION

The present invention is contrived to solve the problem, and the present invention has been made in an effort to automate building of an edge cloud infrastructure to meet a demand for an edge cloud.

The present invention has also been made in an effort to rapidly build the edge cloud by shortening hours required for installing respective components (IaaS, KaaS, and PaaS) of the edge cloud.

To this end, an exemplary embodiment of the present invention provides an edge cloud building system as a edge cloud building system for high-speed installation of components of an edge cloud, in which hierarchical components (IaaS, KaaS, and PaaS) of an edge cloud are installed by using a server node image and a PaaS component image, and then detailed setting of the hierarchical components is performed by using a declarative script.

Here, the server node image as an OS image equipped with a pre-application for configuring OpenStack and Kubernetes Cluster in an OS image is managed for each version, and the PaaS component image is Helm Chart having a basic configuration of a platform application, a security, and an optimized parameter.

A cluster is generated by generating an infrastructure through the server node image, the platform application is installed in the cluster through the PaaS component image, and a detailed setting task for the cluster is performed through the declarative script.

Further, another exemplary embodiment of the present invention provides a high-speed installation method of components of an edge cloud as a high-speed installation method of components of an edge cloud performed in a cloud infra provisioning automation platform on a central cloud, which includes: generating an infrastructure through a server node image including an IaaS component and a KaaS component, and generating a cluster; installing a platform application through a PaaS component image; and performing a detailed setting task of the cluster including certificate generation for the cluster, and a connection task of a master node and a worker node through a declarative script.

Here, the declarative script is configured by an Ansible script.

According to the present invention, there is an effect that hierarchical components (IaaS, KaaS, and PaaS) of an edge cloud are copied to a server node image, and detailed setting for installed hierarchical components is processed by a declarative scheme to shorten hours required for installing each component of the edge cloud, thereby rapidly building a large-scale edge cloud.

Further, there is an effect that an installation scheme according to the present invention is applied to upgrade, backup/restoration, etc., in addition to installation individual components of the edge cloud to shorten hours required for a corresponding task.

DETAILED DESCRIPTION OF THE PREFERRED EMBODIMENT

Figure 1:
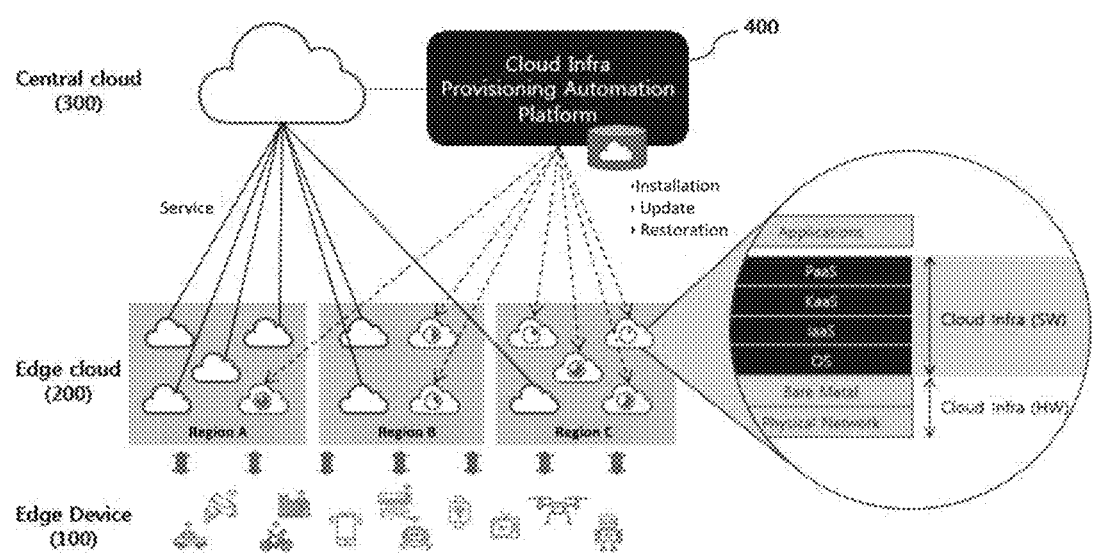
FIG. 1 is a diagram illustrating an overall configuration of an edge cloud building system for high-speed installation of components of an edge cloud according to the present invention.

Hereinafter, an exemplary embodiment of the present invention will be described in detail with reference to the accompanying drawings. A configuration of the present invention and the resulting operation effect will be described apparently appreciated through the following detailed description.

Prior to the detailed description of the present invention, the same component is denoted by the same reference numeral even though the same component is illustrated in another drawing, and when it is judged that a known configuration can make the gist of the present invention be ambiguous, it is noted that a detailed description will be omitted.

FIG. 1 illustrates an overall configuration of an edge cloud building system for high-speed installation of components of an edge cloud according to the present invention.

Referring to FIG. 1, the edge cloud building system for high-speed installation of components of an edge cloud is constituted by an edge device 100, an edge cloud 200, a central cloud 300, and a cloud infra provisioning automation platform 400 on the central cloud 300.

The edge cloud 200 is connected to multiple edge devices 100 including an IoT sensor (not illustrated) and an actuator (not illustrated) to receive various data from the edge device 100, and perform edge computing for transmitting a control signal to the edge device 100.

The central cloud 300 receives data from multiple edge clouds 100 to execute cloud computing and deliver an execution result to the edge cloud 100.

Multiple edge devices 100 produce a lot of data (e.g., big data), and the edge cloud 200 basically performs preprocessing such as data collection from the edge device 100, data refinement for utilizing the big data, cleaning for main processing of the big data, sampling, combination, etc., and delivers the result to the central cloud 300.

A function of the edge cloud 200 may be variously designed, and for example, may also be designed to autonomously process big data without sending the big data to the central cloud 300, and also designed to perform only a basic function, and hand over all core tasks to the central cloud 300.

The central cloud 300 primarily performs deep learning, and analysis, inference, etc., related thereto, and comprehensively performs the task handed over from the edge cloud 200 or distributes some of the tasks to a specific edge cloud 200.

The result processed in the central cloud 300 or the result autonomously processed in the edge cloud 200 is applied to the edge device 100 to control an operation of the edge device 100.

The cloud infrastructure provisioning automation platform 400 (hereinafter, referred to as a provisioning automation platform) according to the present invention is provided on the central cloud 300.

The cloud infra provisioning automation platform 400 may perform tasks such as verification and backup during design, installation (new, update, and restoration), verification (before/after installation), and an operation for a plurality of edge clouds.

The provisioning automation platform 400 according to the present invention implements a high-speed installation tool of components of an edge cloud which combines an image copy scheme and a script scheme to copy hierarchical components (IaaS, KaaS, and PaaS) to a server image and process detailed setting of installed individual components by a declarative script scheme.

Further, the provisioning automation platform 400 provides a user interface based design tool, automatically generates an image and script package based on a design result of a designer generated by the design tool, and version-manages the image and script package in an immutable form to remove a risk of data contamination and allow the edge cloud to be repeatedly processed in parallel.

Figure 2:
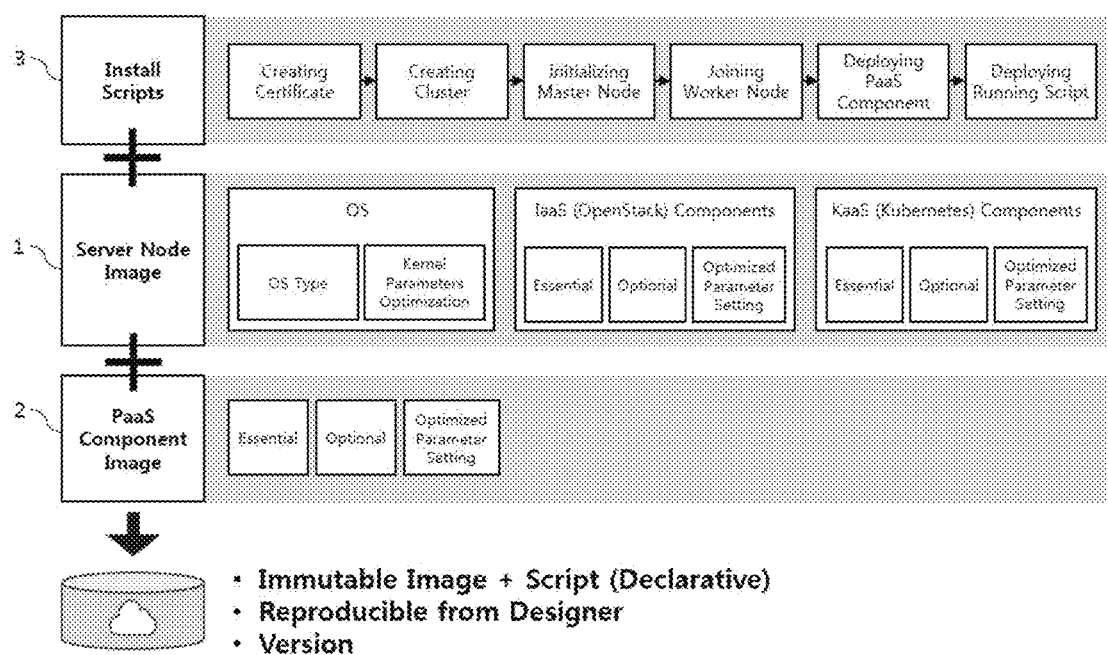
FIG. 2 is a diagram illustrating a tool for high-installation of components of an edge cloud according to the present invention.

FIG. 2 illustrates a tool for high-installation of components of an edge cloud according to the present invention.

The edge cloud building system according to the present invention automatically generates images 1 and 2 and a script 3 illustrated in FIG. 2 by using design results (IaaS design information, KaaS design information, and PaaS design information) designed by an edge cloud designer.

Referring to FIG. 2, first, a server node image 1 refers an OS image equipped with a pre-application required for configuring OpenStack or Kubernetes Cluster in a basic OS image. The server node image 1 includes a basic OS image, a IaaS(OpenStack) component, and a KaaS(Kubernetes) component. For high-speed installation of the edge cloud, kernel parameter optimization on main Linux OS (RHEL, CentOS, Ubuntu), cluster configuration package and docker image, and a core service (dns, overlay, metric) related image are combined to generate the server node image 1 and manages the generated server node image 1 for each version.

The basic OS image includes basic setting information and optimized Kernel parameters information.

The IaaS(OpenStack) component includes setting information for installing Openstack basic components (nova, cinder, neutron, etc.) and additional components (swift, Octavia, etc.).

The component includes setting information for installing essential modules (docker/containerd, etcd, kubelet, k8s control plan image, etc.) and additional modules (haproxy, nfs provisioner, local dns, etc.).

The PaaS component image 2 refers to a helm chart having a basic configuration of a platform application (istio, Prometheus, etc.), a security, and an optimized parameter.

The install script 3 as a declarative script is implemented as the Ansible script. Detailed setting tasks of the cluster, such as cluster certificate generation, control plane initialization, master node and worker node connection, etc. may be performed through the install script 3 by using the infrastructure generated from the server node image 1.

That is, infrastructures such as a load balancer, VMs (master and worker node), a storage, a network, etc., may be generated by using the server node image, and the cluster is generated through the generated infrastructures, and then, subsequent tasks such as the cluster certificate generation, the master node and worker node connection, etc., may be automated by the Ansible script.

Figure 3:
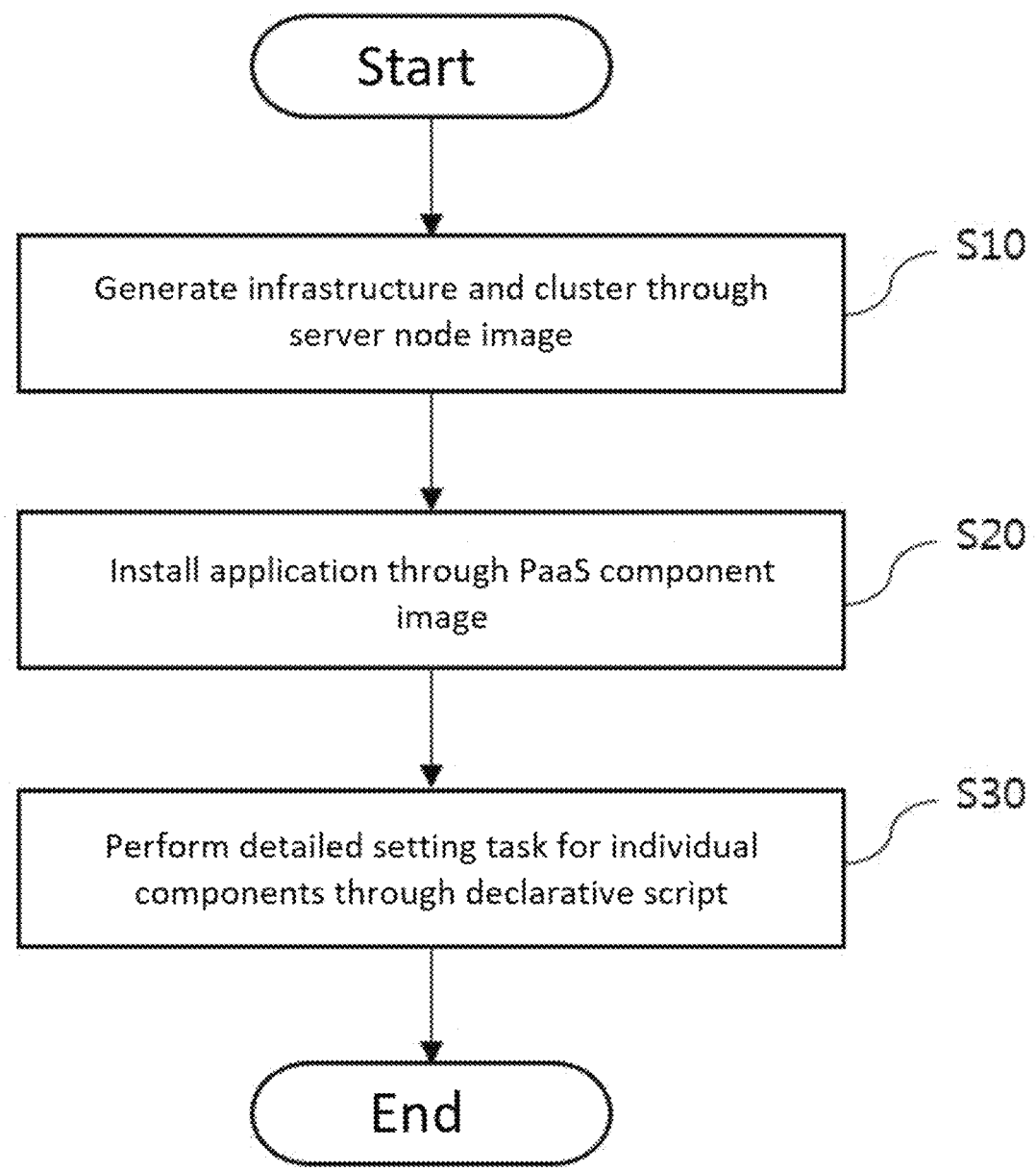
FIG. 3 is a flowchart illustrating a high-speed installation method of components of an edge cloud according to the present invention.

FIG. 3 illustrates a process of a high-speed installation method of components of an edge cloud according to the present invention.

Referring to FIG. 3, the high-speed installation method of components of an edge cloud is constituted by an infrastructure and cluster generating step S10, an application installing step S20, and a detailed setting task performing step S30.

In the infrastructure and cluster generating step S10, an infrastructure is generated through a server node image to generate a cluster. That is, the infrastructure constituting the cluster is generated through an IaaS component of the server node image, and the cluster is generated through a KaaS component of the server node image.

In the application installing step S20, a platform application is installed in the cluster through a PaaS component image.

Thereafter, in the detailed setting task performing step S30, a detailed setting task required for installing the cluster is performed through the declarative script. That is, detailed setting tasks of the cluster including certificate generation for the cluster, a connection task of a master node and a worker node constituting the cluster, a PaaS component deploy, etc., are performed by using the Ansible script as the declarative script.

The above description is just exemplarily describing the present invention, and various modifications can be made by those skilled in the art within the scope without departing from the technical spirit of the present invention. Therefore, the exemplary embodiments disclosed in the present invention do not intend to limit the present invention. The scope of the present invention should be construed based on the following claims, and all the techniques in the equivalent scope thereof should be construed as falling within the scope of the present invention.

What is claimed is:

1. An edge cloud building system for high-speed installation of components of an edge cloud, comprising:
    an edge device including an Internet of Things (IoT) sensor and an actuator for receiving data;
    the edge cloud configured to preprocess the received data from the edge device and deliver the preprocessed data to a central cloud;
    the central cloud configured to perform deep learning, analysis and inference based on the delivered preprocessed data; and
    a cloud infrastructure provisioning automation platform,
    wherein the cloud infrastructure provisioning automation platform is configured to install hierarchical components of Infrastructure as a Service (IaaS), Kubernetes as a Service (KaaS), and Platform as a Service (PaaS) of the edge cloud by using a server node image and a PaaS component image, and then perform setting of the hierarchical components by using a declarative script,
    wherein the server node image is an operating system (OS) image equipped with a pre-application for configuring OpenStack and Kubernetes clusters in a basic OS image and the OS image is managed for each version, and
    wherein the PaaS component image is a helm chart having a basic configuration of a platform application, a security, and an optimized parameter.

2. The edge cloud building system of claim 1,
    wherein the cloud infrastructure provisioning automation platform is configured to generate a cluster by generating an infrastructure through the server node image, install the platform application in the cluster through the PaaS component image, and perform a setting task for the cluster through the declarative script.

* * * * *